(12) United States Patent
Baba et al.

(10) Patent No.: US 7,305,578 B2
(45) Date of Patent: Dec. 4, 2007

(54) FAILOVER METHOD IN A CLUSTERED COMPUTER SYSTEM

(75) Inventors: Tsunehiko Baba, Tokyo (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 613 days.

(21) Appl. No.: 10/942,873

(22) Filed: Sep. 17, 2004

(65) Prior Publication Data
US 2005/0198552 A1  Sep. 8, 2005

(30) Foreign Application Priority Data
Feb. 24, 2004  (JP) ............................. 2004-047177

(51) Int. Cl.
*G06F 11/00* (2006.01)
(52) U.S. Cl. ........................................................ 714/6
(58) Field of Classification Search ..................... None
See application file for complete search history.

(56) References Cited

U.S. PATENT DOCUMENTS 5,621,884 A * 4/1997 Beshears et al. ............... 714/10
6,393,485 B1 * 5/2002 Chao et al. .................. 709/231
6,438,705 B1 * 8/2002 Chao et al. ..................... 714/4
2002/0145983 A1 * 10/2002 Block et al. ................. 370/254
2005/0021751 A1 * 1/2005 Block et al. ................. 709/225

FOREIGN PATENT DOCUMENTS

| JP | 8-221287 | 2/1995 |
| JP | 2000-47894 | 7/1998 |

* cited by examiner

*Primary Examiner*—Nadeem Iqbal
(74) *Attorney, Agent, or Firm*—Reed Smith LLP; Stanley P. Fisher, Esq.; Juan Carlos A. Marquez, Esq.

(57) ABSTRACT

In a high available clustered computer system, a standby computer starts up takeover preparation procedures at a time when occurrence of a failure is watched in an active computer and failover procedures will be started up from the takeover preparation completion status when the failure is detected in the active computer. Thus, speeding up of failover preparation procedures is realized.

With such arrangement, it is possible to realize failover procedures by the hot-standby procedures when a failure occurs in an active computer.

5 Claims, 8 Drawing Sheets

FAILOVER METHOD IN A CLUSTERED COMPUTER SYSTEM

CLAIM OF PRIORITY

The present application claims priority from Japanese application JP 2004-047177 filed on Feb. 24, 2004, the content of which is hereby incorporated by reference into this application.

FIELD OF THE INVENTION

The present invention generally relates to a computer system having fault tolerance for building up an application system, and more specifically to a computer system having a program that is provided with a failover capability which, when a failure occurs in a program or an operating system of a computer currently running an application, makes the active application program to be taken over by another computer.

BACKGROUND OF THE INVENTION

In modern society, computer systems have been recognized to be indispensable for local infrastructures that support our livelihood. Such computer systems are demanded to continue services without shutting down their operations for 24 hours a day. Work of building database for the core processing of on-line systems of banks is a good example. Such database-related work can be subjected to update around the clock, and they must not be allowed for complete shutdown.

A computer system which requires high reliability not permitting a complete shutdown is usually configured with an active computer which executes processes and a standby computer which takes over the processes when a failure occurs in the active computer. Procedures covering the stages from the watch of failure encountered in the active computer to taking over of processes by the standby computer are provided by a cluster program.

To enable taking over of processes by the standby computer when a failure occurs in the active computer, selection and decision of a computer acting as a standby computer from among clustered computers as well as taking over of data used by applications or the operating system (OS) in the active computer are mandatory. In addition, the failure watch procedures in the cluster program are so structured to initiate takeover of processes by the standby computer only when the failure watch procedures are repeatedly executed, which is to prevent occurrence of takeover of processes attributed to a temporary failure or a false failure watch.

A method of selecting a standby computer by which processes will be taken over in a clustered configuration is described in Japanese Patent Laid-open No. 2000-47894, for example. Referring to Japanese Patent Laid-open No. 2000-47894, a technology wherein a standby computer is determined based on CPU loads and available memory of each computer when a failure occurs in an active computer, and failover procedures are executed.

Examples of procedures for taking over processes include a method of starting an application program by a standby computer after occurrence of a failure in an active computer. This method is called "cold standby." As opposed to the cold standby, the hot-standby method exists as a technology for speeding up takeover of processes. For example, referring to Japanese Patent Laid-open No. 8-221287, a technology, wherein a standby computer prefetches an application program to be taken over before occurrence of a failure in an active computer, to reduce failover time for taking over processes by the standby computer when a failure occurred in the active computer.

Referring to Japanese Patent Laid-open No. 2000-47894, in a clustered computer system, determination of a standby computer which is supposed to take over processes of an active computer when a failure occurs in the active computer is executed after execution of failover procedures is determined. On the other hand, Japanese Patent Laid-open No. 8-221287 states a method of speeding up processes required for takeover by arranging that the standby computer is supposed to prefetch the program to be taken over before occurrence of a failure in the active computer. In other words, the standby computer must read the program to be taken over before the failover procedures are executed.

Consequently, in a clustered computer system, to apply the hot-standby technology to realize high-speed failover procedures, all computers are required to prefetch all programs to be executed by respective computers. This, in turn, implies to consume computer resources, and thus causing a problem that operation of the application being processed by the computer becomes slower.

SUMMARY OF THE INVENTION

The present invention provides a function to realize high-speed failover procedures by using the hot-standby procedures to a high available computer system which has an active computer and a standby computer, and the active computer and the standby computer share at least one disk drive.

With the present invention, when a failure occurs in an active computer, a standby computer which takes over processes that are executed by the active computer is determined from cluster computers except the active computer. Failure detection may be done with a system in which guards the active computer using a computer other than the active computer, or with a system in which the active computer independently watches an error based on an error rate, availability of memory capacity, etc. Further, determination of the standby computer may be done with a system in which the above-stated computer which detected the occurrence of failure in the active computer, or with a system in which the computer having detected the failure notifies another computer of the detection to make the determination.

Subsequently, when the standby computer is determined, the computer that determined the standby computer notifies of the determination the computer which is supposed to be the standby computer. The computer notified executes takeover preparation procedures which put the application to be taken over in the status enabling the hot-standby procedures. The takeover preparation procedures typically imply to read an application program being executed by the active computer from a disk drive. In addition, in a case where a high available database system is build of in active/standby computers, it is advantageous to include a process to allocate memory in accordance with data size required for system environment parameters or taking over of programs in this takeover preparation process. After an application is put in a status enabling the hot-standby procedures, the standby computer waits for a notification to execute failover procedures due to occurrence of a failure in the active computer, or for a notification that the failover procedures are not necessary since the failure in the active computer is of a temporary nature.

After the first detection of a failure in the active computer, if it is found that the failure in the active computer has occurred actually, the watch will be continuously executed. Subsequently, it is acknowledged that the failure in the active computer has certainly occurred when the failure is detected consecutively for a fixed number of times (N times), and the failover procedures are executed. In the failover procedures, the computer which acknowledged the failure notifies the standby computer which is in the status where an application is booted to enable the hot-standby procedures in advance according to the present invention, and the failover procedures are executed when the standby computer starts up the application.

On the other hand, after the initial detection of a failure in the active computer, if it is found that the failure in the active computer is of a temporary nature, the failure in the active computer will not be detected before reaching the number of detections for N times which triggers the failover procedures, and the normal status is established. As stated above, in the case where failure detection is consecutively less than N times, a notification that the failover procedures will not be executed will be issued to the standby computer which is in the status where the takeover preparation procedures have been executed in advance, or the status that enables the hot-standby procedures. As a result, the standby computer cancels the application that has been booted to the status enabling the hot-standby procedures, and the computer that has been determined to be the standby computer cancels the takeover preparation procedures for the active computer in which a temporary failure occurred. With the above-stated procedures, the standby computer will restore the status that existed before the failure in the active computer is detected, or the status where the computer can be determined to be a standby computer for any computer, and the cluster including the active and the standby computer is restored to the cold standby status that existed before the occurrence of the failure in the active computer.

To give an example, heartbeat monitoring is performed between an active computer and a standby computer by a cluster program. A guardian computer, when detecting a failure in the active computer, determines a computer for standby procedures from among other computers within the cluster and instructs the standby computer to execute an application to establish the status enabling the hot-standby procedures. In the standby computer, by utilizing data which will not be changed by the active computer, the application is started up to the status enabling the hot-standby, thus waiting for a notification that the failure in the active computer has been acknowledged or the failure is of a temporary nature.

When the notification to the standby computer implies acknowledgment of a failure in the active computer, that is, execution of the failover procedures, the standby computer, by utilizing the remaining portion of the data used by the active computer, takes over processes of the active computer by continuing execution of the application, thus completing the failover procedures. On the other hand, when the failure in the active computer is of a temporary nature, the standby computer shuts down the application which was booted and put in the status enabling the hot-standby procedures for performing the failover procedures, and restores the cold standby status that existed before the occurrence of the failure in the active computer.

According to the present invention stated above, even with the standby computer as responding to the active computer, time required for failover after it has been proved that failover is necessary due to a failure will be as short as that of a system which makes the application to be always ready in the status enabling the hot-standby. In other words, this will provide an advantage that data loss becomes smaller during the failover period and subsequent restoration processes are cut down, for example. Moreover, the computer which will be kept in the ready status, in terms of an application to run on the active computer, is the computer which is in the status before reading the application (cold standby status). Consequently, a system which effectively utilizes computer resources will be obtained.

In particular, with a clustered system in which a plurality of active computers independently execute an application process, the computer that should be kept ready during the normal operation period can be small units of auxiliary computers which can be determined to be a standby computer for any of those active computers. Therefore, it is possible to realize a high available computer system with less computer resources.

DETAILED DESCRIPTION OF THE PREFERRED EMBODIMENTS

It is to be understood that drawings and descriptions regarding the present invention are simplified to show adequate factors which enables clear understanding of the present invention and thus known factors, etc. are omitted in the scope that will not cause problems to execute the invention. For some prior arts described in the present technology, other factors would be considered to be preferable and/or required for implementing the present invention. However, such factors in the technology are already known, do not contribute to make understanding of the present invention easier, and they will not be described herein. Hereinafter, detailed descriptions will be made with regard to the accompanying drawings.

Figure 1:
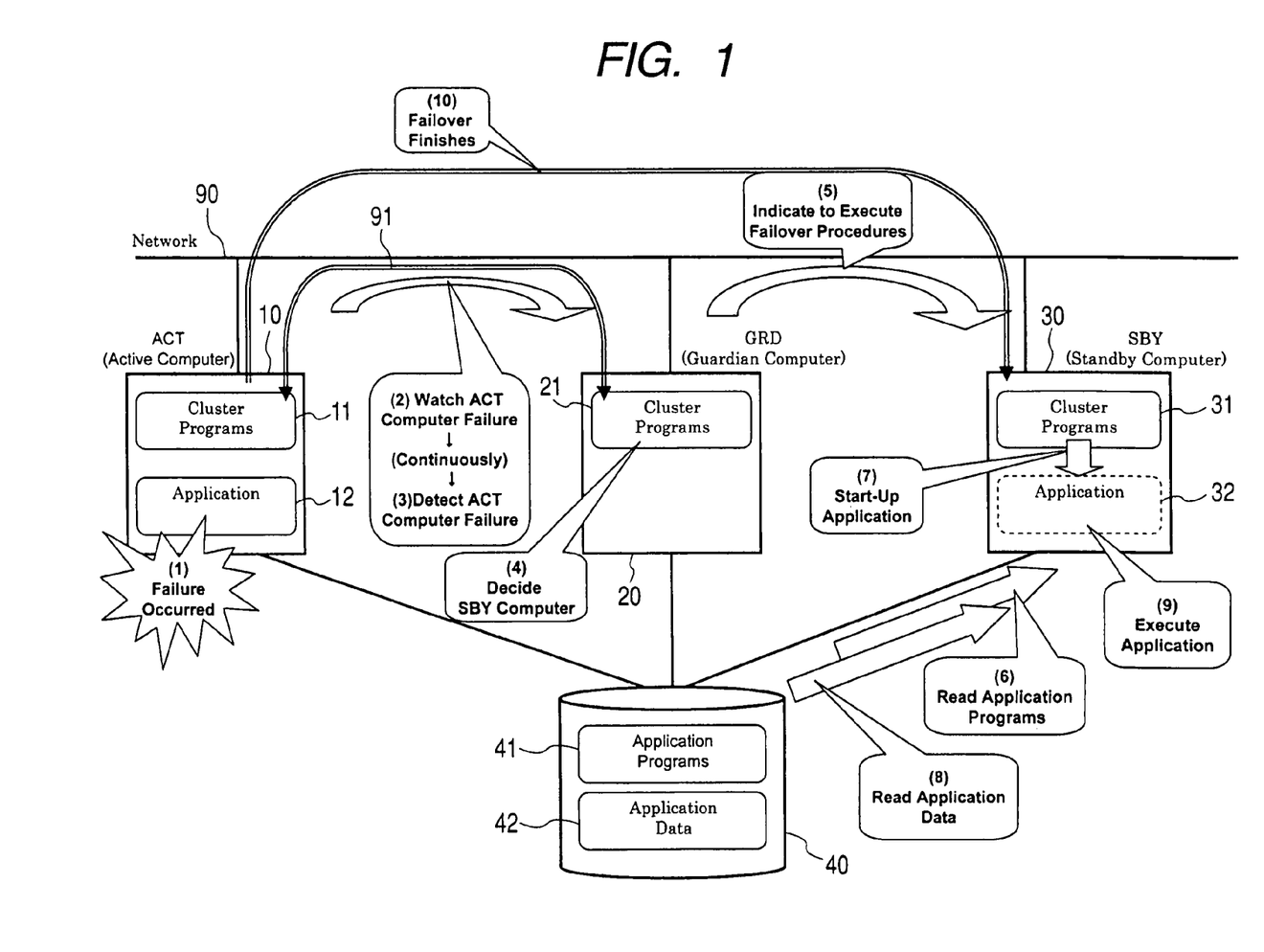
FIG. 1 is a high-order system block diagram for showing problems of a conventional clustered computer system model.

FIG. 1 is a high-order system block diagram for showing problems of a conventional clustered computer system model.

Referring to FIG. 1, two-digit numbers are used to make descriptions easier to understand. Further, similar numbers are employed in subsequent FIGS. 2, 3 and 7, but they are similar to those used for descriptions in FIG. 1 unless otherwise specified.

Referring to FIG. 1, a high available computer system includes an active computer 10, a guardian computer 20, a standby computer 30, and a disk drive 40 which is shared by these computers. The respective computers include cluster programs 11, 21 and 31, each of which executes heartbeat (HB) monitoring with other cluster programs on other computers via a network 90 and has a function to watch a failure in such other computers. The disk drive 40 is coupled to each of the computers 10, 20 and 30, and has a program 41 of application executed by the active computer 10 and data 42 used by the application. In the event that a failure (procedure (1) in the figure) occurs in the active computer 10, the cluster program 21 on the guardian computer 20 watches the failure in the active computer 10 by way of the HB monitoring 91 (procedure (2) in the figure).

Here, with the failover procedure executed by the cluster programs, to prevent occurrence of takeover (failover) of procedures caused by a temporary failure or a miswatched failure, the occurrence of failure is detected for the first time when the watch is repeatedly performed (procedure (3) in the figure), and failover is executed. Upon detection of the failure in the active computer, the cluster program 21 determines the standby computer 30 which takes over the application 12 of the active computer (procedure (4) in the figure), and indicates the cluster program 31 on the standby computer 30 to execute failover procedures (procedure (5) in the figure). The cluster program, on receiving the instruction, reads the program 41 for takeover from the disk drive 40 (procedure (6) in the figure) and starts up an application 32 (procedure (7) in the figure). Thereafter, the application 32 reads application data 43 from the disk drive 40 (procedure (8) in the figure) and executes the application to complete the failover (procedure (10) in the figure). The failover to be performed in a series of the cluster configuration is ensured even if the role of each computer is substituted.

To apply the hot-standby technology which speeds up failover to the above-stated failover, since the standby computer is not yet decided at the time the detection is made in the active computer, it is necessary for each computer to apply the hot-standby procedures to an application of all computers in advance. However, there is a problem in that such action is not practical since the action consumes computer resources and thus putting operations of application that should be originally executed in stress.

Figure 2:
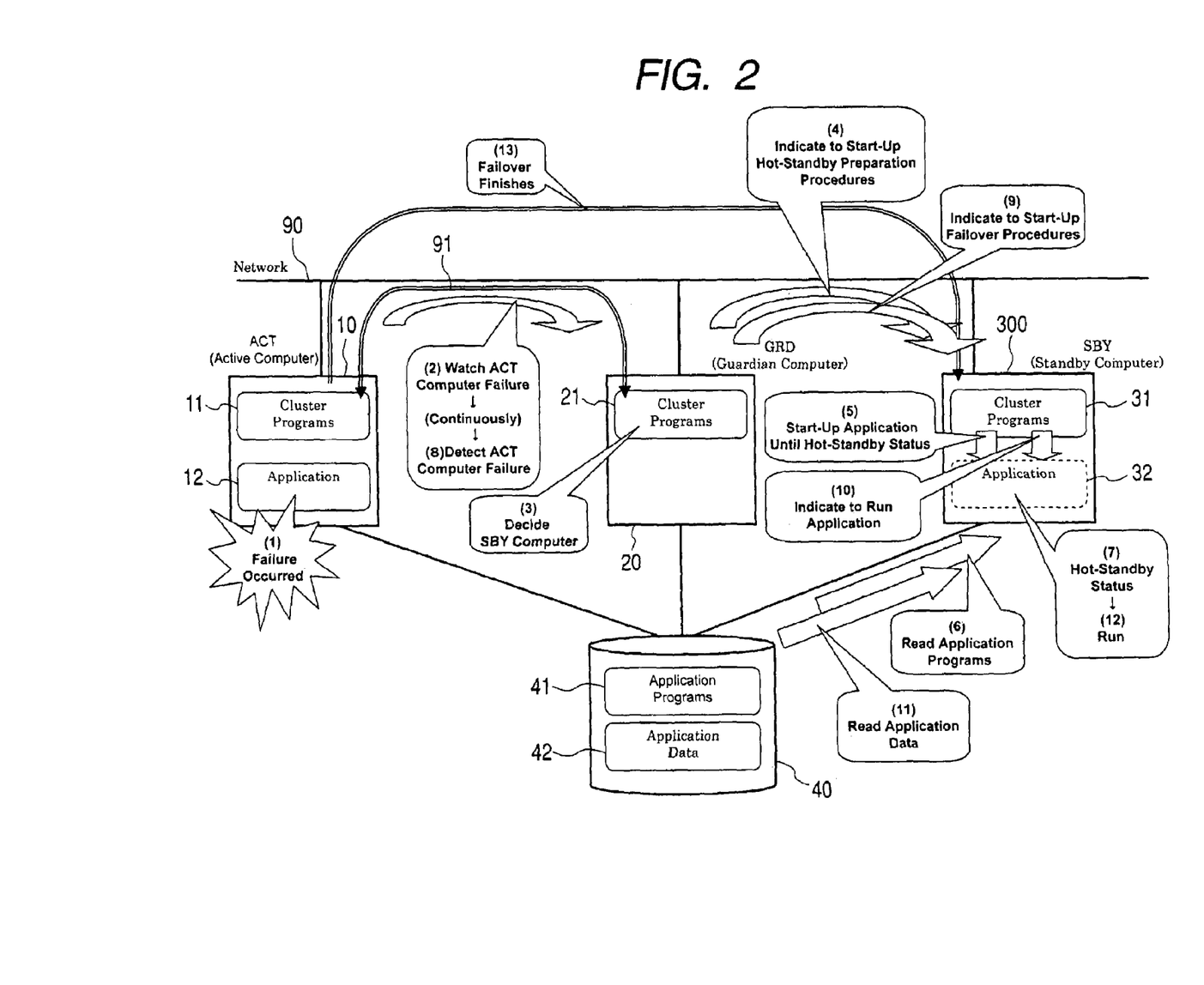
FIG. 2 is a high-order system block diagram of a clustered computer system model for a case where failover is executed in a first preferred embodiment of the present invention.

FIG. 2 shows a clustered computer system model according to a first embodiment of the present invention.

Referring to FIG. 2, when a failure occurs in an active computer 10 (procedure (1) in the figure), cluster programs 21 on a guardian computer 20 watches the failure (procedure (2) in the figure). The cluster programs 21, upon watch of the failure, determine a standby computer 30 which takes over the procedures of the active computer 10 (procedure (3) in the figure), and indicate cluster programs 31 of the standby computer to start up hot-standby preparation procedures (procedure (4) in the figure). The cluster programs 31, on receiving the indication, start up the hot-standby procedures of an application (procedure (5) in the figure). With such procedures, application programs 41 are read from a disk drive 40 (procedure (6) in the figure), and the application is started up to a state where the hot-standby failover is possible (procedure (7) in the figure).

On the other hand, when the cluster programs 21 of the guardian computer which indicated the hot-standby preparation procedures have watched failures continuously for fixed number of times after the first detection of failure, the failure in the active computer is detected (procedure (8) in the figure). Upon detection of the failure, the cluster programs 21 of the guardian computer indicate the cluster programs 31 of the standby computer to start up failover procedures of the application (procedure (9) in the figure). The cluster programs 31, on receiving the indication, indicates the application 32 that has already been in the hot-standby status (procedure (10) in the figure), to read the application data 42 on the disk drive 40 (procedure (11) in the figure) for running the application (procedure (12) in the figure), thus completing the failover procedures (procedure (13) in the figure).

In FIG. 1, the standby computer is determined after a failure in the active computer was detected and then failover procedures are executed by way of the cold-standby procedures. On the contrary, according to the first embodiment having the above-stated means, the standby computer is determined at the time when a failure is watched, and the standby computer is put in the hot-standby status in advance. Thus, it is possible to realize high-speed failover using the hot-standby procedures even in a clustered computer system.

Figure 3:
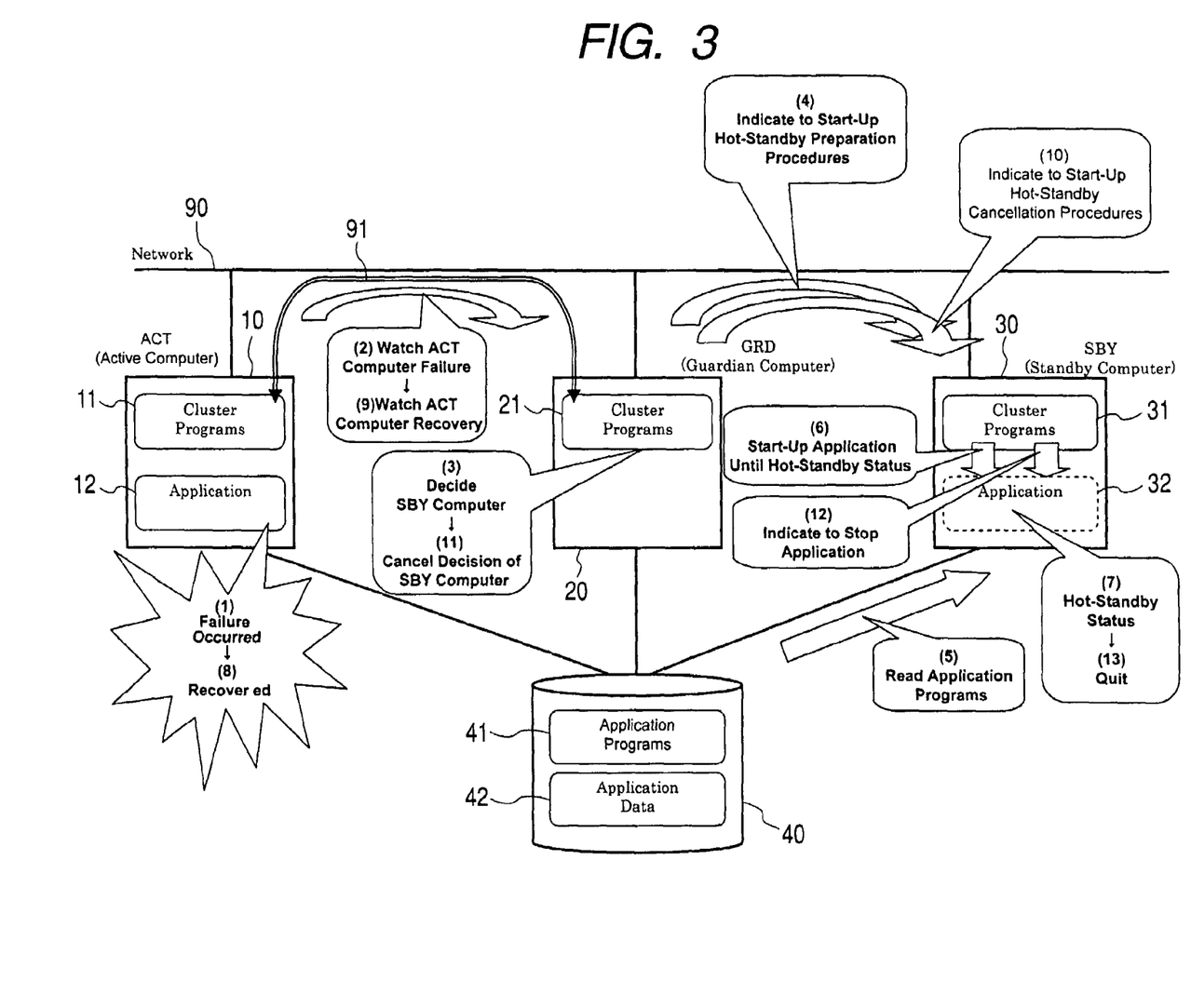
FIG. 3 is a high-order system block diagram of a clustered computer system model for a case where a failure is recovered and failover is not executed in a second preferred embodiment of the present invention.

FIG. 3 shows a clustered computer system model according to a second preferred embodiment of the present invention.

FIG. 3 illustrates the system model in which while a failure occurs in an active computer 10 (procedure (1) in the figure), later the failure is recovered (procedure (7) in the figure).

Referring to FIG. 3, processes covering the stages from the occurrence of the failure in the active computer (procedure (1) in the figure) to the point where an application 32 is put in hot-standby status in a standby computer 30 (procedure (7) in the figure) are executed in the similar processes to those stated in FIG. 2. When the failure in the active computer is recovered (procedure (8) in the figure), the cluster programs 21 watch recovery of the failure (procedure (9) in the figure). After the watch, the cluster programs 21 instruct the cluster program 31 of the standby computer 30 to cancel the hot-standby status (procedure (10) in the figure), and cancel the status of the standby computer that has already been determined (procedure (11) in the figure).

On the other hand, the cluster programs 31, upon receiving the instruction to cancel the hot-standby status, instruct the application 32 which has already been in the hot-standby status to stop the application (procedure (12) in the figure), and quit the application (procedure (13) in the figure).

According to the second embodiment having the above-stated means, when, in FIG. 2, the failure is not detected in the active computer and the failure is recovered, it is possible to cancel the standby computer which started up the hot-standby preparation procedures, thus enabling to restore the status back to the status before the occurrence of the failure, or more specifically to the cluster system in which the standby computer can be assigned to any voluntary systems.

Figure 4:
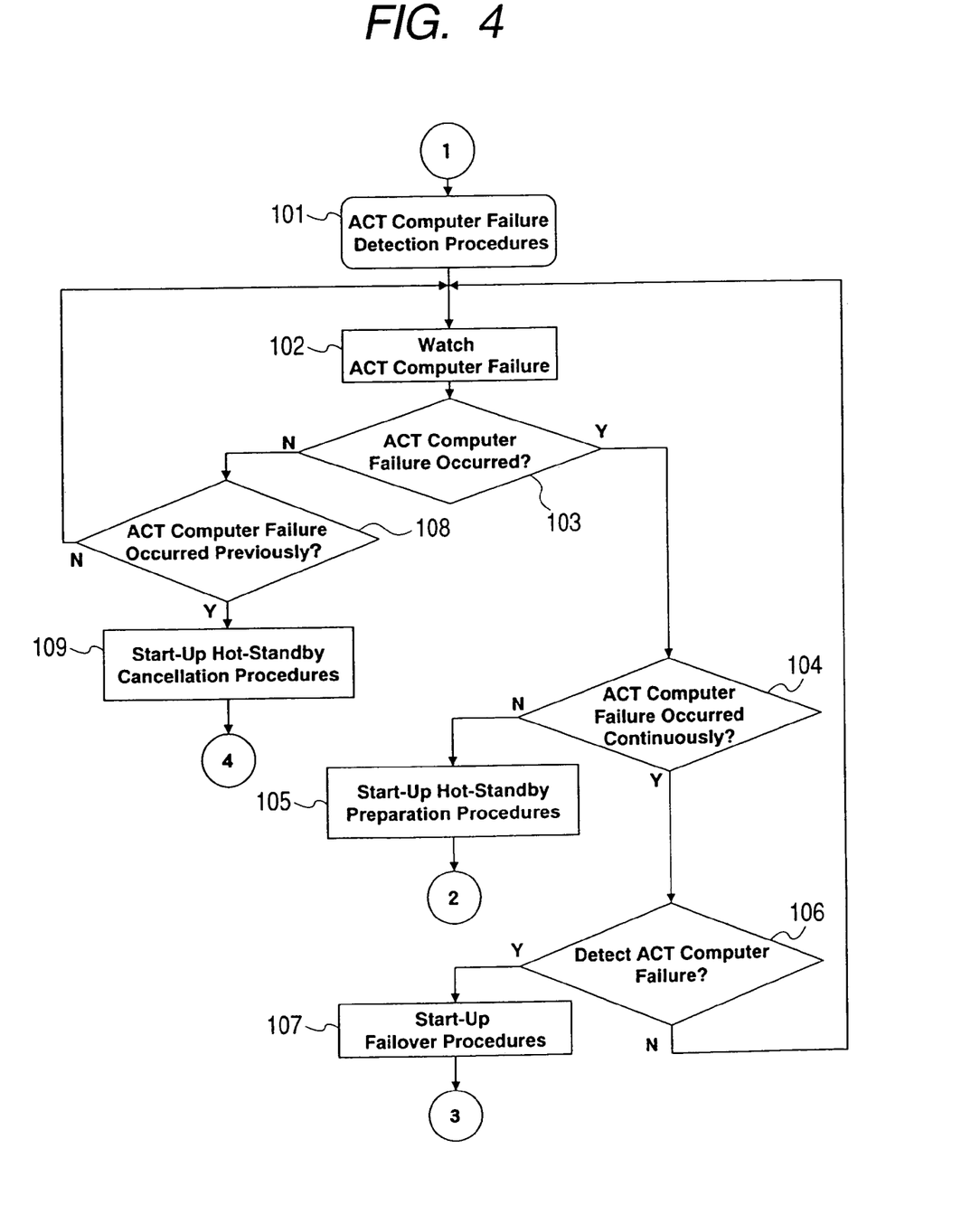
FIG. 4 is a process flow chart describing a process in which cluster programs of a guardian computer watch a failure in an active computer in the first and second embodiments of the present invention.
Figure 5:
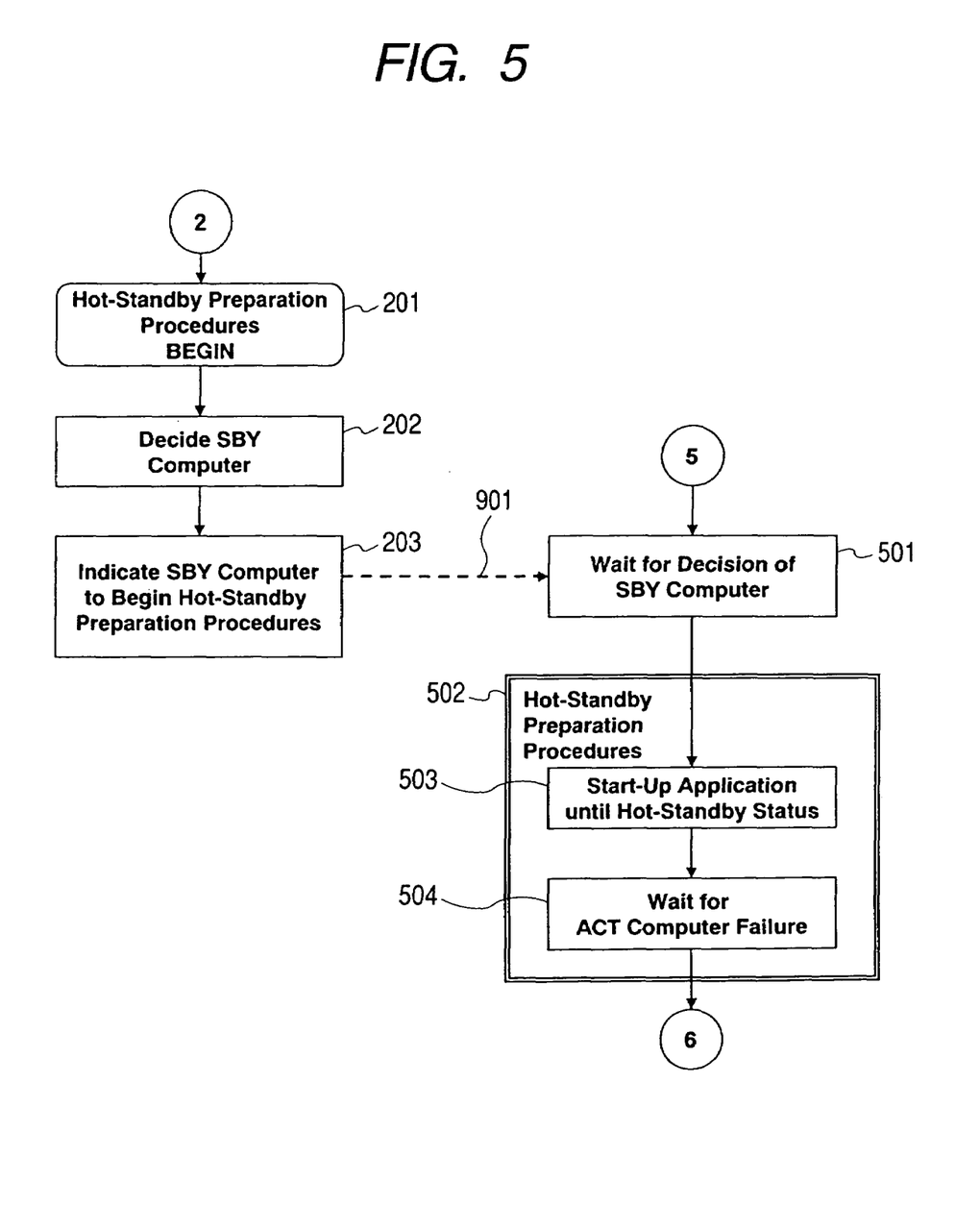
FIG. 5 is a process flow chart describing a process in which cluster programs of a standby computer put the standby computer in the hot-standby status in the first and second embodiments of the present invention.
Figure 6:
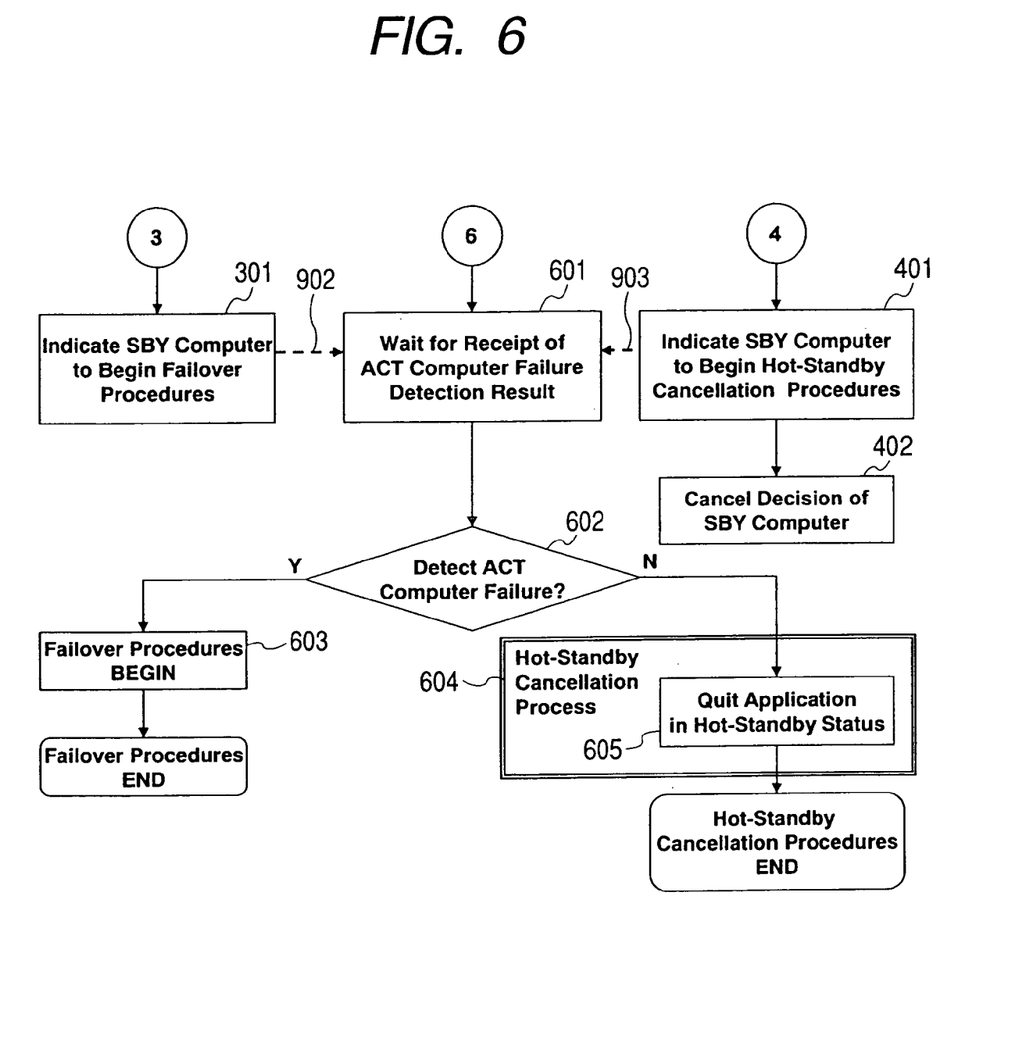
FIG. 6 is a process flow chart describing a process in which cluster programs of a standby computer execute failover from the hot-standby status in the first embodiment of the present invention, and a process in which the cluster programs of the standby computer cancel the hot-standby status in the second embodiment of the present invention.

FIGS. 4, 5 and 6 are process flow charts showing operations of cluster programs of guardian/standby computers in the computer system of the first and the second embodiment of the present invention.

FIG. 4 shows operations of the cluster programs 21 of the guardian computer 20. The cluster programs 21 initiate active computer failure detection procedures 101, execute failure watch procedures 102 of the active computer 10, and perform judgment procedure 103 as to whether a failure has been detected or not.

As a result of the judgment procedure 103, if a failure is detected, procedures 104 are executed. The procedure 104 judges if the failure is detected continuously. As a result of the judgment, if the failure is not watched consecutively, hot-standby preparation start-up procedures 105 which prepare a standby computer in the hot-standby status are executed. On the other hand, if the failure has been detected consecutively, judgment procedures 106 are executed as to whether the failure is watched consecutively for N times and the failure can be detected.

As a result of the judgment procedure 106, if the failure is detected, procedures 107 which execute procedures for failover to the standby computer which has been put in the hot-standby status in the procedures 105 are executed. If the failure is not detected, the process is repeated at the failure watch procedures 102 and the failure is continuously watched until it is detected.

On the other hand, as a result of the judgment procedures 103, if the failure does not occur in the active computer, procedures 108 are executed. In the procedures 108, a judgment is executed as to whether the status has shifted to the failure-recovered status from the status where the failure was watched in the active computer in advance. If the failure was detected in advance, procedures 109 which cancel the hot-standby status are executed since the standby computer is in the hot-standby status, but the failure in the active computer has been recovered. On the other hand, if the failure was not detected consecutively, the process is repeated at the failure watch processes 102 and the failure in the active computer is continuously watched.

FIG. 5 is a process flow chart showing operation procedures in which the guardian computer 20 starts up the hot-standby preparation procedures of the standby computer 30. The left portion of FIG. 5 shows a process flow of the cluster programs 21 of the guardian computer, and the right portion of FIG. 5 shows a process flow of the cluster programs 31 of the standby computer.

Referring to the left portion of FIG. 5, the processes 105 in FIG. 4 initiates the hot-standby preparation procedures (procedures 201), and procedure 202 determines the computer 30 which is supposed to be the standby computer from among computers within the cluster. After the procedures 202, hot-standby preparation procedures are instructed to the cluster program 31 of the standby computer determined (procedures 203), and the instruction is given to the cluster program 31 of the standby computer via communication 901. On the other hand, referring to the right portion of FIG. 5, the cluster programs of the standby computer wait for a determination as to which active computer will become the standby computer (procedures 501). In the procedure 501, when an instruction by the cluster programs 21 of the guardian computer is received to start up the hot-standby preparation procedures as the standby computer of the active computer 10 via the communication 901, the cluster programs 31 execute the hot-standby preparation procedures. Hot-standby preparation procedures 502 correspond to procedures (5), (6) and (7) in FIG. 4. The hot-standby preparation procedures 502 wait until application startup procedures 503 is executed and, in the hot-standby status, the failure in the active computer is detected by the cluster programs 21 of the guardian computer (procedures 504).

FIG. 6 is a process flow chart showing operation procedures executed by the cluster programs 21 of the guardian computer 20 and the cluster programs 31 of the standby computer 30 in accordance with detection/recovery of a failure in the active computer. The left and the right portion of FIG. 6 show procedures to be executed by the cluster programs 21 of the guardian computer when a failure in the active computer has been detected and recovered, respectively, and such respective programs are executed by procedures 107 and 109 shown in FIG. 4. The middle portion of FIG. 6 shows operation procedures of the guardian computer in accordance with the cluster programs 31 of the standby computer, and such programs are executed by procedures 506 shown in FIG. 5.

Referring to FIG. 6, the cluster programs 31 of the standby computer is in the hot-standby status (procedures 506 in FIG. 5) and wait for communication of the result of failure judgment of the active computer 10 by the cluster programs 21 of the guardian computer (procedures 601). Upon receiving the communication result, the cluster programs 31 judges whether the failure has been detected or recovered based on the indication result (procedure 602).

First, when the cluster programs 21 of the guardian computer detects the failure in the active computer, procedures 301 are executed as the failover procedures 107 in FIG. 4. In the procedures 301, an indication is made to the cluster programs 31 of the standby computer to execute failover procedures via communication 902. Upon receiving the communication 902, the cluster programs 31 judge, based on the procedure 602, that the failure has been detected, and execute the failover procedures (procedure 603).

On the other hand, when the cluster programs 21 of the guardian computer detect recovery of the failure in the active computer, it executes procedures 402 as the hot-standby cancellation procedures 109 in FIG. 4. In the procedures 402, an indication is made to the cluster programs 31 of the standby computer to cancel the hot-standby status of the application programs 32 of the standby computer via communication 903. After executing the procedures 402, the cluster programs 21 cancel the determination of the standby computer 30 that was executed in the procedures 202. Upon receiving the communication 903, the cluster programs 31 judges that the failure has been recovered based on the procedure 602, and execute cancellation procedures 604 of the hot-standby status. The procedures 604 should include application quit procedures 605 if, for example, the application startup procedures 503 have been executed in the hot-standby preparation procedures 502 in FIG. 5.

Figure 7:
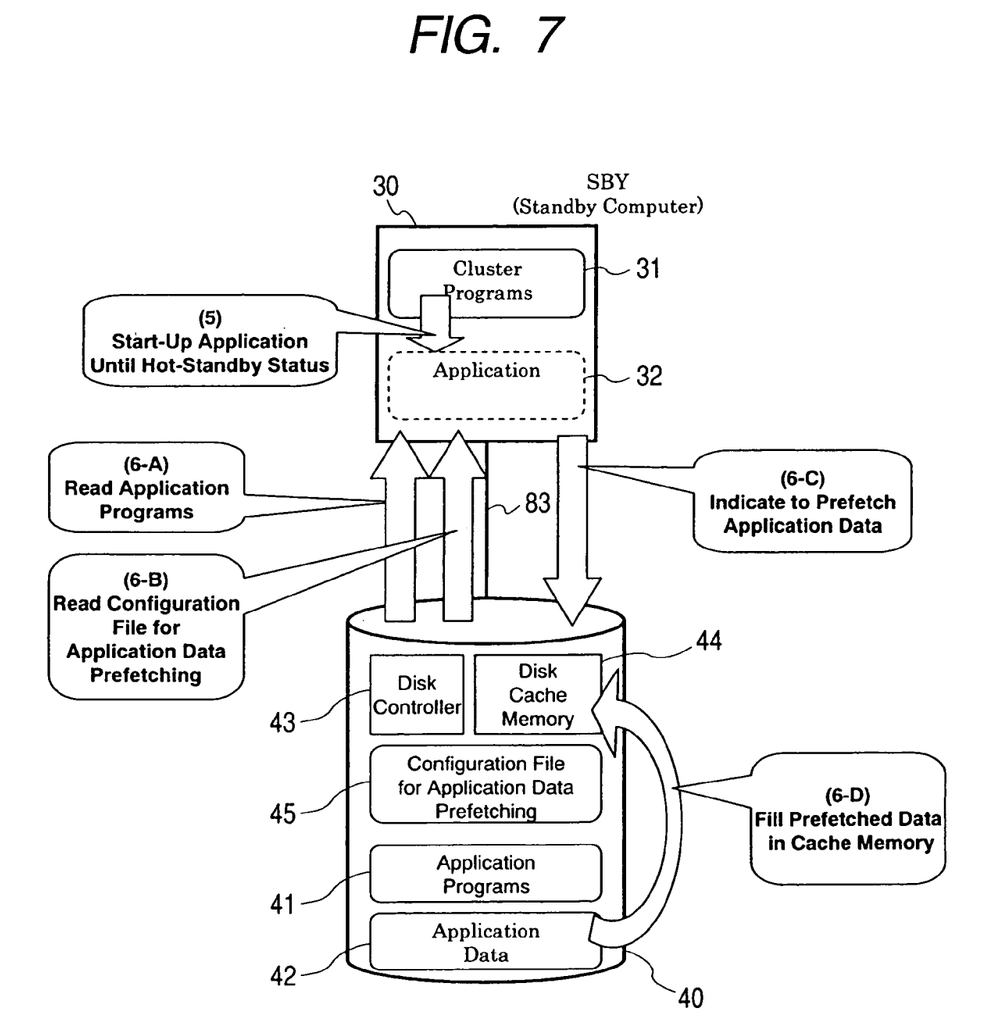
FIG. 7 is a high-order system block diagram of a computer system model which includes a process to indicate a disk drive to start up failover preparation process in the process to put the standby computer in the hot-standby status in a third preferred embodiment of the present invention.

FIG. 7 is a clustered computer system model according to a third embodiment wherein procedures for a disk drive are added to the procedures for putting the standby computer in the hot-standby status described in the first embodiment of the present invention.

FIG. 7 shows processes covering the stages until the standby computer completes the standby status, in which procedures (5) and (6-A) correspond respectively to the procedures (5) and (6) in FIG. 2.

Referring to FIG. 7, a disk drive 40 includes a disk controller 43, a disc cache 44 and a configuration file for application data prefetching 45. The disk controller 43 has a function, for example, to read data available in the disk drive 40 onto the disk cache 44. In addition, the configuration file for application data prefetching 45 defines data that is required for reading application data of the procedures (11) that are executed in FIG. 2.

After executing the procedures (6-A), the cluster programs 31 read the configuration file for application data prefetching 45 (procedures (6-B) in the figure), and instruct the disk controller 43 to prefetch data defined in the file 45 onto the disk cache 44 (procedures (6-C) in the figure). Upon receiving the instruction, the controller 43 fills the designated data in the disk cache 44 (procedures (6-D) in the figure).

According to the third embodiment having the above-stated means, when a failure in the active computer is detected and failover procedures are being executed in the first embodiment, application data to be read will be filled in the disk cache of a disk drive. Consequently, it becomes possible to rapidly read application data, thus enabling to realize high-speed failover procedures.

Figure 8:
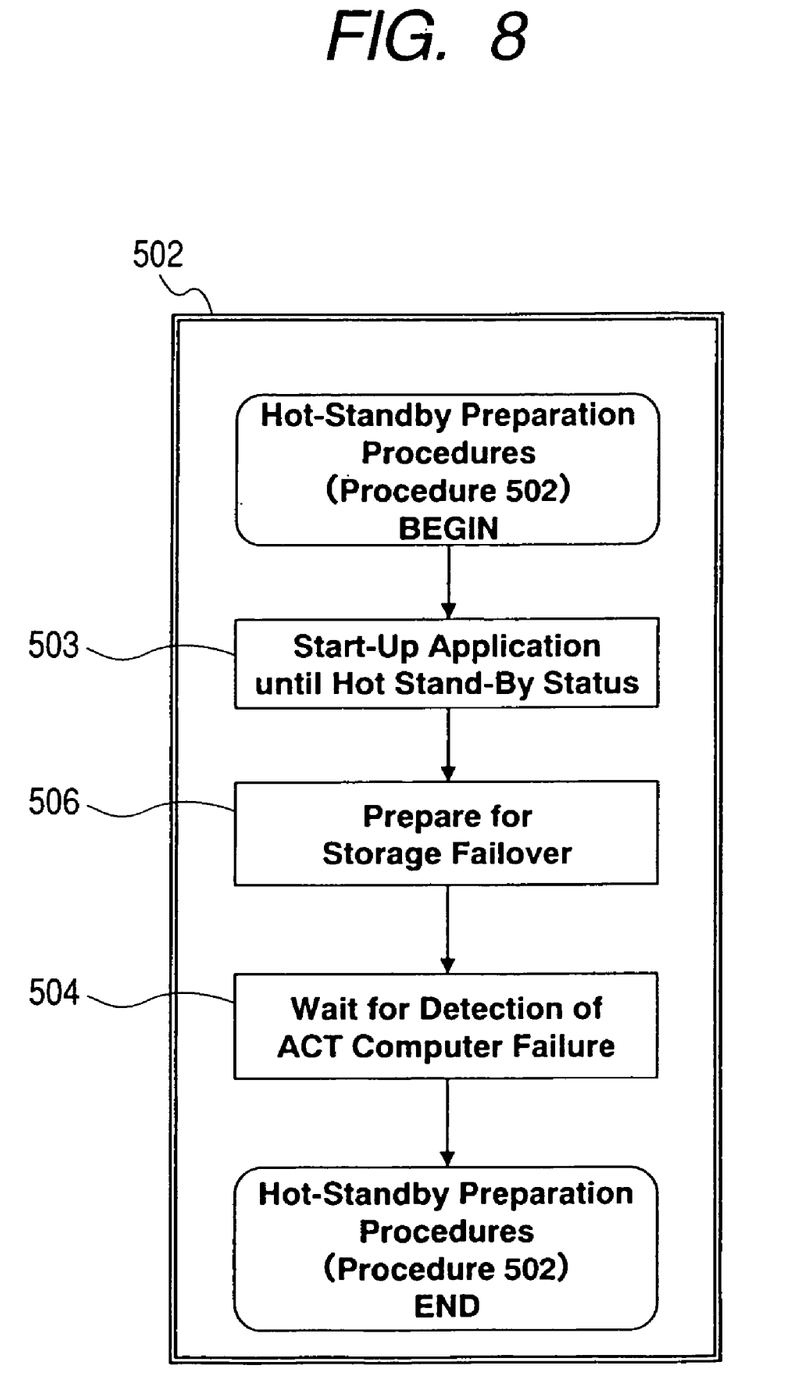
FIG. 8 is a process flow chart describing a process to indicate a disk drive to start up preparation process for failover which is included in a process to put a standby computer to the hot-standby status in the third embodiment of the present invention.

FIG. 8 is a process flow chart showing operations in a third embodiment of the present invention.

FIG. 8 states a process flow which corresponds to the hot-standby preparation procedures 502 in FIG. 5.

Procedures 503 and 504 are respectively similar to the procedures 503 and 504 stated in FIG. 5. Upon completion of the procedures 503, an indication is made to storage to execute a preparation process for failover (procedures 505), and execution of the procedure 504 completes the hot-standby preparation procedures. The procedure 505, for example, may be a series of procedures comprising the procedures (6-B), (6-C) and (6-D) in FIG. 7.

FIGS. 7 and 8 show a process flow to read the data by defining the data in the configuration file for application data prefetching, as a method of determining data to be read onto a disk cache. Alternatively, a method may be applicable which utilize the frequency of access to application data of the active computer, for example.

As stated above, the third embodiment realizes a system that has a function to realize failover procedures which can rapidly execute processes for a disk drive at the time of failover procedures, by adding the preparation process for failover of the disk drive to the procedures to put the standby computer in the hot-standby status.

The embodiments of the present invention stated above are configured such that the cluster programs 21 of the guardian computer 20 watch the status of the active computer 10 for detection of a failure. Alternatively, however, it is also possible to take another configuration wherein the cluster programs 11 of the active computer detect a failure within the active computer itself.

Further, the present embodiments are configured such that the standby computer 30 different from the guardian computer 30 takes over the procedure by the failover. Besides, the guardian computer and the standby computer may be configured to be one and the same computer.

Further, the embodiments employ the method in which the standby computer 30 starts up the application 12 that was being executed by the active computer 10 as the application 32 anew. Alternatively, however, if an application which is the same as the application to be taken over by the standby computer has already been running, a method may be employed of adding data to be processed by the running application anew.

In addition, for simple explanation, while the embodiment employs the method of preloading the application program as the method of executing failover by the hot-standby procedures, the methods of hot-standby procedures and types of applications shall not be limited.

According to the embodiments of the present invention stated above, the following advantages can be produced.

First, in a high available clustered computer system, a standby computer on which failover procedures are executed is determined when the occurrence of a failure is watched in an active computer, the standby computer is supposed to start up preparation process for failover and the failover is executed to the standby computer that is in the failover preparation completion status when the failure is detected in the active computer. Thus, it is possible to realize high-speed failover procedures.

Further, in the preparation process for failover, by adding procedures for failover preparation to a disk drive, it is possible to realize high-speed failover procedures.

Further, by employing a method of filling data to be used at the time of failover procedures in a disk cache, it is possible to realize the preparation process for failover of the above-stated disk drive.

Furthermore, when the failure in the active computer is recovered after the execution of takeover preparation procedures by the standby computer, by recovering the standby computer from the takeover preparation status, it is possible to realize failover procedures which will be restored to the same status that existed before occurrence of the failure when the failure is recovered.

As stated in the above, the present invention provides a high available computer system which virtually realizes failover procedures by the hot-standby procedures with less system costs. Consequently, the present invention is expected to be extensively applied in the field of cluster computing.

What is claimed is:

1. A failover method for a clustered computer system including an active computer, a plurality of computers which could be standby computers to take over a procedure of said active computer, and a disk drive which is coupled to these computers and stores a file required for an application to execute the procedure of said active computer, said method comprising the steps of:
   determining a standby computer which is supposed to take over a procedure, with the fact that occurrence of a failure is detected in said active computer as being a first trigger, and notifying the determined computer;
   allowing the notified computer to execute the takeover preparation procedure; and
   allowing the computer which executed said takeover preparation procedure to take over a procedure that was executed by said active computer, with the fact that a failover procedure becomes necessary due to the failure in said active computer as being a second trigger.

2. A failover method according to claim 1, wherein said takeover preparation procedure implies a procedure to read an application program that was running on said active computer from said disk drive.

3. A failover method according to claim 1, wherein, based on said first trigger, said disk drive executes a preparation process for failover.

4. A failover method according to claim 3, wherein the preparation process for failover executed by said disk drive includes a procedure of prefetching data to be accessed during the failover procedure to a cache from a disk.

5. A failover method for a clustered computer system including an active computer, a plurality of computers which could be standby computers to take over a procedure of said active computer, and a disk drive which is coupled to these computers and stores a file required for an application to execute a procedure of said active computer, said method comprising the steps of:

determining a standby computer which is supposed to take over procedures, with the fact that occurrence of a failure is detected in said active computer as being a trigger, and allowing said standby computer to execute the takeover preparation procedures; and     canceling the takeover preparation procedure of said standby computer, with the fact that a failover procedure becomes unnecessary due to recovery of the failure in said active computer as being a trigger.

\* \* \* \* \*